(12) United States Patent
Yamashita et al.

(10) Patent No.: US 9,695,797 B2
(45) Date of Patent: Jul. 4, 2017

(54) VEHICULAR FLUID POWER TRANSMITTING DEVICE

(71) Applicants: Toshiya Yamashita, Toyota (JP); Naoki Itazu, Nagoya (JP); Yoichi Nakashima, Nissin (JP); Takashi Hori, Anjo (JP); Masaru Ebata, Chita (JP); Yasunori Doman, Hirakata (JP)

(72) Inventors: Toshiya Yamashita, Toyota (JP); Naoki Itazu, Nagoya (JP); Yoichi Nakashima, Nissin (JP); Takashi Hori, Anjo (JP); Masaru Ebata, Chita (JP); Yasunori Doman, Hirakata (JP)

(73) Assignees: TOYOTA JIDOSHA KABUSHIKI KAISHA, Aichi-ken (JP); AISIN AW CO. LTD., Aichi-ken (JP); EXEDY CORPORATION, Osaka (JP)

( * ) Notice: Subject to any disclaimer, the term of this patent is extended or adjusted under 35 U.S.C. 154(b) by 568 days.

(21) Appl. No.: 14/348,104

(22) PCT Filed: Sep. 28, 2012

(86) PCT No.: PCT/IB2012/001913
§ 371 (c)(1),
(2) Date: Mar. 28, 2014

(87) PCT Pub. No.: WO2013/046008
PCT Pub. Date: Apr. 4, 2013

(65) Prior Publication Data
US 2014/0234093 A1 Aug. 21, 2014

(30) Foreign Application Priority Data
Sep. 29, 2011 (JP) ................. 2011-214880

(51) Int. Cl.
*F01D 25/24* (2006.01)
*F03B 15/04* (2006.01)
(Continued)

(52) U.S. Cl.
CPC .............. *F03B 15/04* (2013.01); *F01D 25/24* (2013.01); *F16H 41/24* (2013.01); *F16H 45/02* (2013.01);
(Continued)

(58) Field of Classification Search
CPC .......... F01D 25/24; F03B 15/04; F16H 41/24; F16H 45/02
(Continued)

(56) References Cited

U.S. PATENT DOCUMENTS 5,259,191 A * 11/1993 Takino et al. ........... F16H 41/26
416/197 C
5,398,562 A   3/1995 Muchmore
(Continued)

FOREIGN PATENT DOCUMENTS

CN        101988569 A    3/2011
DE    10 2005 034 933 A1   2/2007
(Continued)

OTHER PUBLICATIONS

International Search Report for corresponding International Patent Application No. PCT/IB2012/001913 mailed Jan. 17, 2013.

*Primary Examiner* — Kevin Lee
(74) *Attorney, Agent, or Firm* — Sughrue Mion, PLLC

(57) ABSTRACT

A vehicular fluid power transmitting device includes a pump impeller, a turbine runner, a damper device, a set member, and a centering member. The pump impeller has a pump shell to which torque from a drive source is input. The damper device has a damper input member and a damper output member. The damper input member is connected to
(Continued)

an output shaft of the drive source. The damper output member is connected to the pump shell. The set member is fixed to the pump shell, and is connected to the damper output member. Also, the centering member is provided protruding toward the pump shell from the output shaft of the drive source, and is fitted together with the damper input member.

4 Claims, 3 Drawing Sheets

(51) Int. Cl.
　　　*F16H 41/24*　　　(2006.01)
　　　*F16H 45/02*　　　(2006.01)
(52) U.S. Cl.
　　　CPC ............... *F16H 2045/0205* (2013.01); *F16H 2045/0221* (2013.01); *F16H 2045/0252* (2013.01); *F16H 2045/0294* (2013.01)

(58) Field of Classification Search
　　　USPC .................................... 415/170.1; 416/197 C
　　　See application file for complete search history.

(56) References Cited

U.S. PATENT DOCUMENTS

| | | | |
|---|---|---|---|
| 6,840,041 B2* | 1/2005 | Okada et al. | ........... F16H 41/26 |
| | | | 416/197 C |
| 2010/0178172 A1* | 7/2010 | Yamashita | ............... F16H 41/26 |
| | | | 416/197 C |
| 2011/0195795 A1 | 8/2011 | Murata et al. | |

FOREIGN PATENT DOCUMENTS

| | | |
|---|---|---|
| JP | 05-050202 U | 7/1993 |
| JP | 637568 U | 5/1994 |
| JP | 2008/075843 A | 4/2008 |
| JP | 2010-084852 A | 4/2010 |
| JP | 2010-255753 A | 11/2010 |
| WO | 2010/038131 A2 | 4/2010 |

* cited by examiner

VEHICULAR FLUID POWER TRANSMITTING DEVICE

BACKGROUND OF THE INVENTION

1. Field of the Invention

The invention relates to a fluid power transmitting device provided in a vehicle.

2. Description of Related Art

A vehicular fluid power transmitting device provided in a power transmission path between a power source of a vehicle and an automatic transmission is known. This vehicular fluid power transmitting device transmits torque generated by the power source to an input shaft of the automatic transmission via fluid. Some known examples of a vehicular fluid power transmitting device are a fluid coupling and a torque converter. A fluid coupling is provided with a pump impeller that is rotatably driven about an axis by a drive source such as an engine, and a turbine runner that is rotated about this axis by operating fluid that is pushed out by the pump impeller. A torque converter is described in Japanese Utility Model Application Publication No. 05-050202 (JP 05-050202 U) and Japanese Patent Application Publication No. 2010-84852 (JP 2010-84852 A). The torque converter is provided with not only the pump impeller and the turbine runner, but also a stator that is arranged between the pump impeller and the turbine runner, in a manner rotatable about the axis.

In such a vehicular fluid power transmitting device as that described above, a pump shell constitutes an outer shell of the pump impeller. Also, a center piece is provided with a center portion of the pump shell, that the center piece protruding toward the engine side. This center piece is fitted into a centering hole that is open in a shaft end surface of a crankshaft, such that the fluid power transmitting device is centered.

In JP 05-050202 U and JP 2010-84852 A, a damper device is provided between the pump shell and a drive plate that is fixed to a shaft end of the crankshaft. The center piece protrudes out from the pump shell. Also, the centering hole is open in the shaft end surface of the crankshaft such that the center piece is able to fit in the centering hole. In this case, relative rotation occurs between the center piece and the centering hole within a range within which relative rotation is allowed in the damper device such that the center piece and the centering hole slide each other. This sliding causes the center piece or the centering hole to wear, which reduces centering accuracy, and as a result, vibration of the vehicle may increase. One proposal as a countermeasure to this involves providing a bush or a bearing between the center piece and the centering hole, as described in JP 2010-84852 A. However, with the structure proposed in JP 2010-84852 A, there are also problems such as an increase in the number of parts; an increase in the number of processes, and an increase in the number of assembly hours.

SUMMARY OF THE INVENTION

The invention thus provides a vehicular fluid power transmitting device in which centering accuracy of a pump shell is able to be maintained.

One aspect of the invention relates to a vehicular fluid power transmitting device that includes a pump impeller, a turbine runner, a damper device, a set member, and a centering member. The pump impeller has a plurality of pump blades and a pump shell to which torque from a drive source is input. The plurality of the pump blades is provided inside of the pump shell. The turbine runner has a plurality of turbine blades and a hub portion, is supported by a shaft end portion of an output shaft of the vehicular fluid power transmitting device, and is rotated by receiving operating fluid pushed out by the pump blades. The plurality of the turbine blades is provided in positions opposite the pump blades. The hub portion supports the turbine blades. The damper device is provided between the drive source and the pump shell in an axial direction of the output shaft of the vehicular fluid power transmitting device, has a damper input member, an elastic member and a damper output member, and suppresses pulsation of torque from the drive source and transmits the resultant torque to the pump shell. The damper input member is connected to an output shaft of the drive source. The elastic member is housed inside the damper input member. The damper output member is connected to the pump shell. The set member is fixed to the pump shell and is connected to the damper output member. Also, the centering member is provided protruding toward the pump shell from the output shaft of the drive source, and is fitted together with the damper input member.

With the vehicular fluid power transmitting device structured in this way, the damper output member is fixed to the set member that is fixed to the pump shell. Also, the damper input member and the centering member are fitted together, the centering member protruding toward the pump shell from the output shaft of the drive source. Because the damper input member and the centering member that is fixed to the output shaft of the drive source are fitted together, the damper input member and the centering member will not rotate relative to one another. As a result, centering is able to be achieved. Therefore, centering accuracy of the pump shell is able to be maintained without using a bearing or a bush between the center piece and the centering hole.

The vehicular fluid power transmitting device according to this aspect of the invention may also include a drive plate and a bearing assembly. The drive plate is fixed to a shaft end of the output shaft of the drive source, and is connected to the damper input member. The damper input member is relatively rotatably supported by the set member via the bearing assembly. Also, the output shaft of the drive source may be a crankshaft of an engine. Moreover, the centering member may be fixed to a shaft end of the crankshaft, and protrude toward a side away from the engine in the axial direction. According to this structure, the damper input member and the damper output member are centered and able to rotate relative one another by the bearing assembly. Here, the damper input member is fixed to the set member that is fixed to the pump shell. Also, damper input member is fixed to the output shaft of the drive source. Therefore, the damper input member, as well as the damper output member that rotates relative to the damper input member, is also centered.

Also, the vehicular fluid power transmitting device according to the mode of the invention described above may also be structured as described below. In this structure, the damper output member is housed in the damper input member, and has an output radially outer portion and an output radially inner portion. Here, torque from the damper input member is transmitted via the elastic member to the output radially outer portion. The output radially inner portion is fixed to an end surface, on the drive source side, of the set member. Also, the damper input member has an input radially outer portion and a cylindrical boss portion that is curved so as to extend to an axial position of a radially inner side of the output radially inner portion. The elastic member and the output radially outer portion are housed within the input radially outer portion. The bearing assembly is fitted in between a radially outer peripheral surface of the cylindrical boss portion and a radially inner peripheral surface of the set member. Also, a radially outer peripheral surface of the centering member is fitted to a radially inner peripheral surface of the cylindrical boss portion. According to this structure, the centering accuracy of the pump shell is able to be maintained without using a bearing or a bush between the center piece and the centering hole. Also, the bearing assembly is provided on the radially inner side of the set member, so mounting space to the radially outer side of the set member can be ensured regardless of the plate thickness of the damper output member. Therefore, mountability of the damper can be increased.

The vehicular fluid power transmitting device according to the mode of the invention described above may also include a plurality of set bolts. This plurality of set bolts screws into a plurality of female threaded holes formed in the axial direction in the set member. Also, the output radially inner portion may be fastened to the set member by the set bolts. Through-holes may be formed in opposite portions of the damper input member, the opposite portions being opposite the set bolts. According to this structure, mounting space to the radially outer side of the set member can be ensured regardless of the plate thickness of the damper output member. Therefore, mountability of the damper can be increased.

Also, in the vehicular fluid power transmitting device according to the mode of the invention described above, the bearing assembly may be fitted to a radially inner peripheral surface of the output radially inner portion. According to this structure, the mutual centering accuracy of the damper input member and the damper output member is increased, so vibration of the vehicle is able to be further suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the invention will be described in detail with reference to the accompanying drawings.

Figure 1:
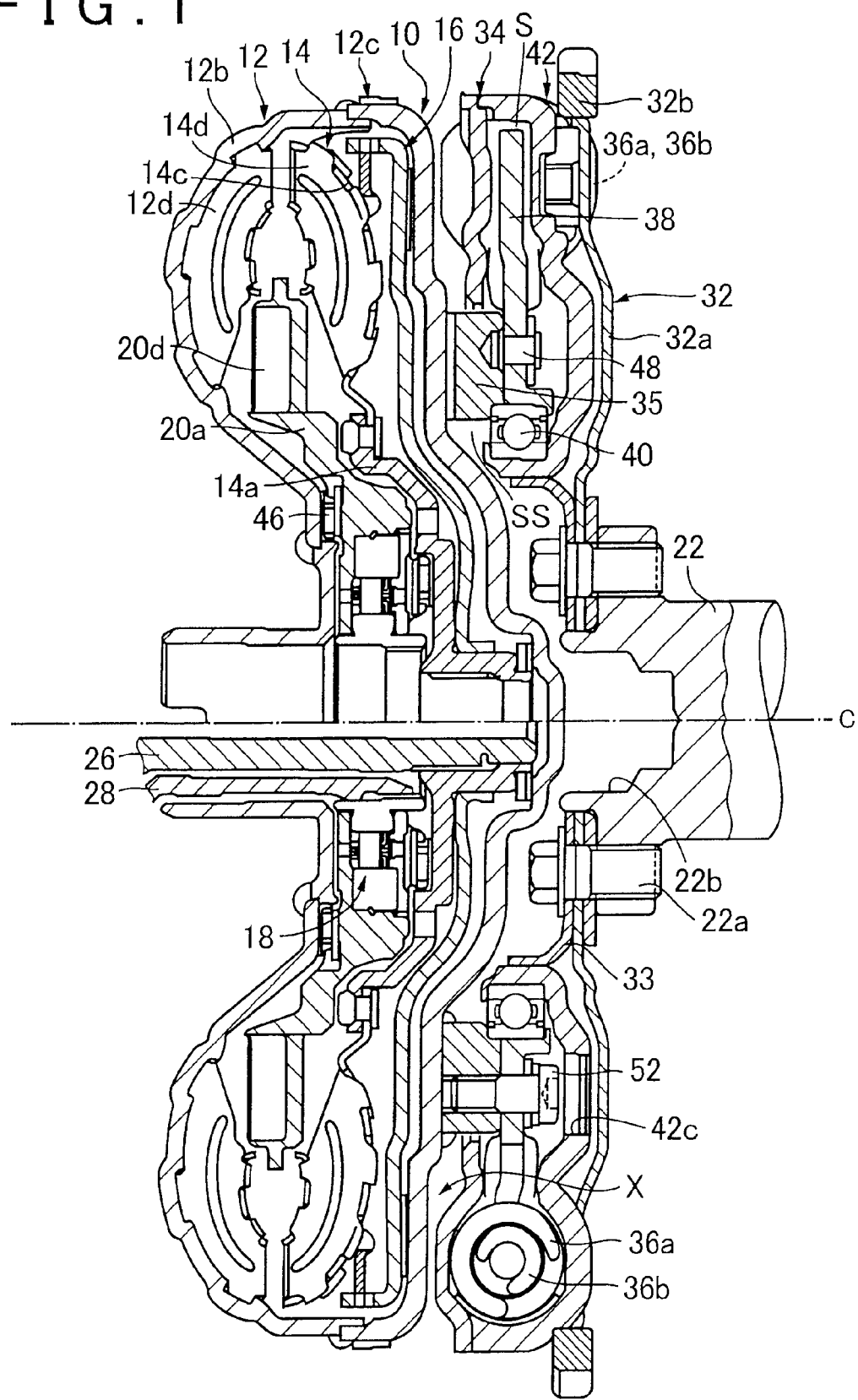
FIG. 1 is a sectional view of the structure of a vehicular torque converter according to one example embodiment of the invention.
Figure 2:
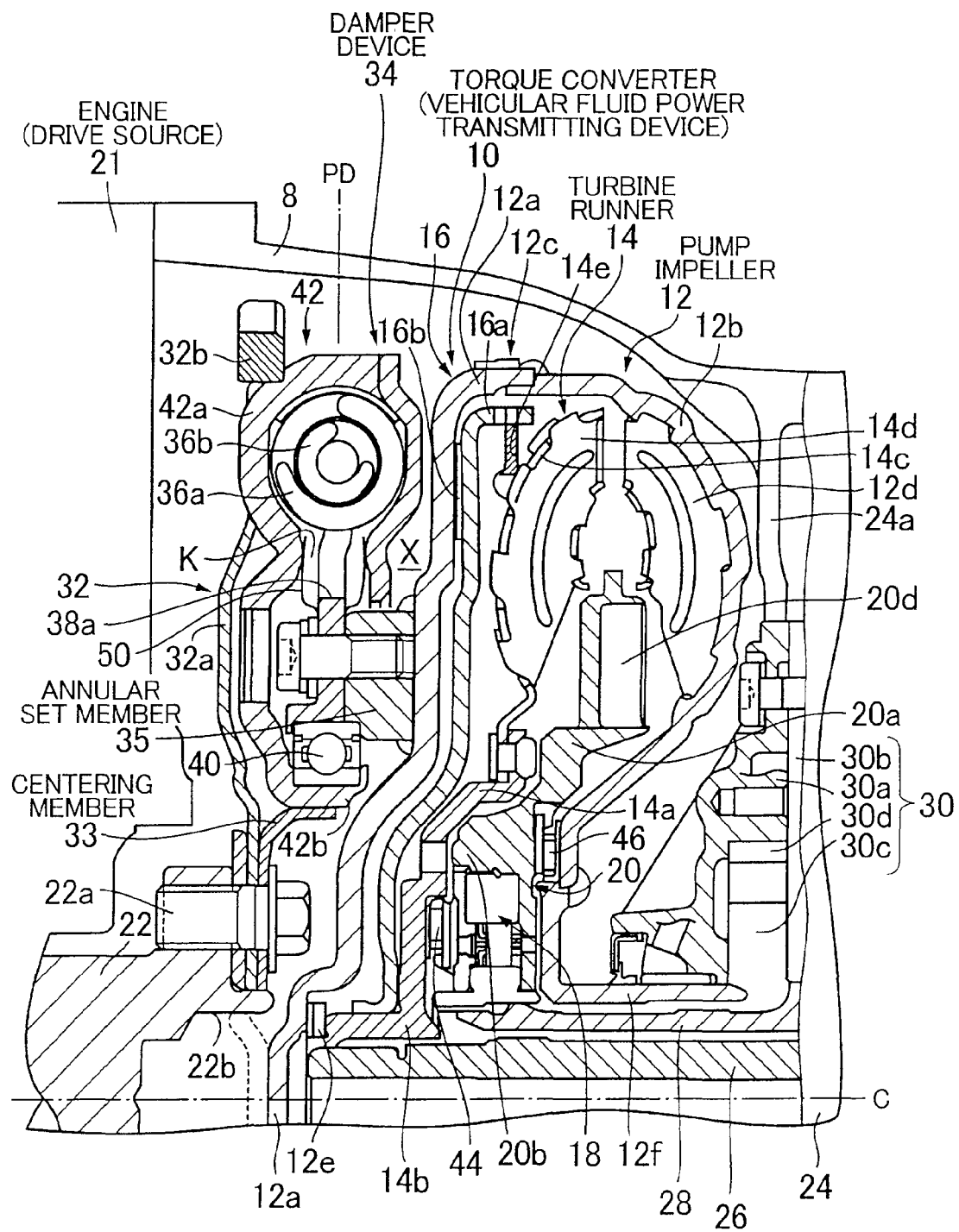
FIG. 2 is a view of the vehicular torque converter provided inside of a cylindrical housing of a vehicle.

FIG. 1 is a sectional view of the structure of a torque converter 10 that is a vehicular fluid power transmitting device according to one example embodiment of the invention. FIG. 2 is a view of the torque converter 10 provided inside of a cylindrical housing 8 of a vehicle. The torque converter 10 is provided with a pump impeller 12, a turbine runner 14, a lock-up clutch 16, a one-way clutch 18, and a stator 20. The torque converter 10 multiplies torque input from a crankshaft 22 of an engine 21 that functions as a drive source, and outputs the multiplied torque from an input shaft 26 of a transmission 24. Here, the input shaft 26 of the transmission 24 functions as an output shaft of the torque converter 10.

The pump impeller 12 includes a disc-shaped front shell 12a, a rear shell 12b, a pump shell 12c, and pump blades 12d. The pump shell 12c is connected to the crankshaft 22 of the engine 21 via a drive plate 32 and a damper device 34. Also, the pump shell 12c is rotated about an axis C at the same rotation speed as the crankshaft 22. The plurality of pump blades 12d is arranged overlapping each another in the circumferential direction inside of a radially outer portion of the rear shell 12b. The turbine runner 14 includes a disc-shaped hub portion 14a, a cylindrical shaft portion 14b, a turbine shell 14c, and turbine blades 14d. The disc-shaped hub portion 14a is spline-engaged with a shaft end portion of the input shaft 26, and is relatively rotatably abutted against the front shell 12a via a sliding ring 12e (i.e., abutted against the front shell 12a via the sliding ring 12e in a manner so as to be able to rotate relative to the front shell 12a). The cylindrical shaft portion 14b protrudes from the center of the hub portion 14a and is spline-engaged with the shaft end portion of the input shaft 26. The plurality of turbine blades 14d is fixed to a radially outer portion of the hub portion 14a, in a manner overlapping with each other in the circumferential direction and opposing the pump blades 12d. The turbine runner 14 is provided so as to rotate, together with the input shaft 26, about the axis C. The stator 20 includes a circular disc portion 20a and a circular cylindrical portion 20b. A radially outer portion of the circular disc portion 20a constitutes stator blades 20d. These stator blades 20d are positioned between the pump blades 12d of the pump impeller 12 and the turbine blades 14d of the turbine runner 14 in the axial direction of the input shaft 26. A radially inner portion of the stator 20 constitutes the circular cylindrical portion 20b. The circular cylindrical portion 20b is fitted with the one-way clutch 18. The stator 20 is rotatably supported about the axis C via the one-way clutch 18 by a cylindrical fixed shaft 28 that is a non-rotatable member that is fixed to the housing 8. Also, a first thrust bearing 44 on a front side is interposed between the stator 20 and the hub portion 14a of the turbine runner 14, and a second thrust bearing 46 on a rear side is interposed between the stator 20 and the rear shell 12b. Therefore, the position of the stator 20 in the direction of the axis is determined. Here, the front side refers to the side that is relatively closer to the engine 21 in the direction along the axis. Also, the rear side refers to the side that is relatively closer to the transmission 24 in the direction along the axis. Also, the direction along the axis may also be simply referred to as the "axial direction". That is, the axial direction of the output shaft of the torque converter 10 may also be regarded as the direction along the axis.

A partition wall 24a is provided inside the housing 8. The partition wall 24a divides the housing 8 into a space in which the transmission 24 is housed and a space in which the torque converter 10 is housed. A hydraulic pump 30 is provided on this partition wall 24a. The hydraulic pump 30 includes a pump body 30a, a pump cover 30b, an inner ring gear 30c, and an outer ring gear 30d. The pump body 30a is fixed to the partition wall 24a. The pump cover 30b is fixed to the pump body 30a. The inner ring gear 30c and the outer ring gear 30d are rotatably housed within a space formed between the pump body 30a and the pump cover 30b, and are in mesh with each other. A shaft end of a cylindrical shaft 12f is engaged in a relatively non-rotatable manner with the inner ring gear 30c, i.e., in a manner so as not to be able to rotate relative to the inner ring gear 30c. The cylindrical shaft 12f is arranged radially inward of the rear shell 12b of the pump impeller and protrudes in the axial direction. As a result, the hydraulic pump 30 is rotatably driven by the engine 21. The hydraulic pump 30, i.e., the pump body 30a, protrudes out in a conical shape from the partition wall 24a toward the torque converter 10 side, i.e., the engine 21 side or the input side. The input shaft 26 is rotatably supported by the partition wall 24a via a bearing, not shown. The input shaft 26 protrudes into the space within which the torque converter 10 is housed and supports the torque converter 10.

Hereinafter, when not specifically stated, the output side or the transmission 24 side refers to the side relatively close to the transmission 24 in the axial direction. Similarly, when not specifically stated, the input side or the engine 21 side refers to the side relatively close to the engine 21 in the axial direction. The radially outer portion of the rear shell 12b and the radially outer portion of the front shell 12a are offset so as to protrude toward the output side thereof, i.e., the transmission 24 side. The rear shell 12b constitutes the output side i.e., the transmission 24 side, of the pump shell 12c. Also, the front shell 12a constitutes the input side, i.e., the engine 21 side, of the pump shell 12c. Therefore, the radially inner portion of the rear shell 12b is concave-shaped toward the input side and receives a tip end portion of the pump body 30a. That is, the tip end portion of the pump body 30a overlaps in the radial direction with the radially outer portion of the rear shell 12b. As a result, space is able to be utilized efficiently, so the dimension of the torque converter 10 in the direction of the axis C is short. In this specification, the axial direction and the direction of the axis C refer to the same direction.

In the structure described above, the radially outer portion of the rear shell 12b protrudes toward the transmission 24 side in the axial direction. Therefore, the pump blades 12d, which are arranged on an inside wall surface of the radially outer portion of the rear shell 12b, are also offset toward the output side in the axial direction. Thus, the stator blades 20d and the turbine blades 14d are also offset toward the output side, i.e., the transmission 24 side, in the axial direction while maintaining a constant relative positional relationship with the pump blades 12d. In this example embodiment, the radially outer portion of the circular disc portion 20a of the stator 20 is positioned farther toward the transmission 24 side than the circular cylindrical portion 20b. Accordingly, the circular disc portion 20a has a conical shape. Therefore, the stator blades 20d are offset toward the output side in the axial direction so as not to overlap with the one-way clutch 18 in the radial direction. Also, a radially outer portion of the hub portion 14a of the turbine runner 14 has a conical shape so as not to overlap with the one-way clutch 18 in the radial direction. Accordingly, the turbine blades 14d are offset toward the output side in the axial direction, such that a portion of the turbine blades 14d of the turbine runner 14 does not overlap with the one-way clutch 18 in the radial direction, and a portion of the turbine blades 14d of the turbine runner 14 does overlap with the one-way clutch 18 in the radial direction.

The lock-up clutch 16 includes a circular disc-shaped piston 16a and an annular friction element 16b. A radially center portion of the piston 16a is slidably engaged with the radially outer surface of the cylindrical shaft portion 14b that protrudes from the center of the hub portion 14a of the turbine runner 14 that is relatively non-rotatably engaged with the shaft end portion of the input shaft 26. Also, the piston 16a is relatively non-rotatably engaged with an engaging protrusion 14e that protrudes from the turbine shell 14c. The friction element 16b is fixed to a radially outer portion of the piston 16a, or a portion of the inside of the front shell 12a opposite the radially outer portion of the piston 16a. The friction element 16b directly connects the turbine runner 14 and the pump impeller 12 to each other by frictional force. As described above, the radially outer portion of the front shell 12a is offset so as to protrude toward the output side, i.e., the transmission 24 side, in the axial direction. Here, the radially outer portion of the front shell 12a constitutes the input side, i.e., the engine 21 side, of the pump shell 12c. Therefore, the radially outer portion of the piston 16a is also similarly offset so as to protrude toward the output side, i.e., the transmission 24 side, in the axial direction, so interference with the front shell 12a and the turbine runner 14 is prevented. In this way, the radially outer portions of the front shell 12a and the piston 16a of the lock-up clutch 16 are offset toward the output side in the axial direction, so that the radially outer portion of the piston 16a and the friction element 16b overlap with the one-way clutch 18 in the radial direction. The friction element 16b is fixed to the radially outer portion of the piston 16a.

The drive plate 32 is fixed to the shaft end of the crankshaft 22 of the engine 21 by a bolt 22a. The drive plate 32 includes a circular disc-shaped portion 32a and a ring gear 32b. The ring gear 32b is fixed to an radially outer portion of the circular disc-shaped portion 32a so as to be in mesh with a pinion of a starter motor, not shown. The damper device 34 is provided between this drive plate 32 and the front shell 12a. The front shell 12a constitutes a front portion of the pump shell 12c. Also, an annular centering member 33 that is a pressed part is fixed to the shaft end of the crankshaft 22 by the bolt 22a. Also, a radially inner portion of the centering member 33 overlaps with a radially inner portion of the drive plate 32 in the axial direction.

The damper device 34 includes a circular disc-shaped driven plate 38 and a damper shell 42. A radially inner portion of the driven plate 38 is fixed to the front shell 12a via a ring-shaped annular set member 35. The ring-shaped annular set member 35 is concentric with the axis C. Also, notches 38a are formed in a plurality of locations at equidistant intervals in the radially outer portion of the driven plate 38. These notches 38a are open to the radially outer side so as to house two types of damper springs, i.e., a large damper spring 36a and a small damper spring 36b. The large damper spring 36a and the small damper spring 36b are wound in coil-shapes such that the circumferential direction of the damper device 34 is a longitudinal direction of the large damper spring 36a and the small damper spring 36b. Also, the large damper spring 36a and the small damper spring 36b are concentric with each other. The damper shell 42 is rotatably supported about the axis C via an annular bearing 40 by the annular set member 35, and is fixed to the circular disc-shaped portion 32a of the drive plate 32. Here, the annular set member 35 is fixed to the front shell 12a. The damper shell 42 is provided with circular columnar-shaped spaces that extend in the circumferential direction. The circular columnar-shaped spaces house the pair of damper springs, i.e., the large damper spring 36a and the small damper spring 36b, so as to cover the outer peripheries of the large damper spring 36a and the small damper spring 36b. Also, the circular columnar-shaped spaces are formed in a plurality of locations at equidistant intervals in the circumferential direction in the damper shell 42. Pulsation of torque transmitted from the engine 21 is absorbed by the large damper spring 36a and the small damper spring 36b contracting in the circumferential direction, i.e., the longitudinal direction thereof, in response to an offset in the rotational phase between the driven plate 38 and the damper shell 42.

In this example embodiment, the damper shell 42 serves as a damper input member, the driven plate 38 serves as a damper output member, the annular bearing 40 serves as a bearing assembly, and the large damper spring 36a and the small damper spring 36b each serve as an elastic member.

Of the parts that make up the damper device 34, the damper shell 42 has the largest mass. The damper shell 42 is supported by the centering member 33 that is fixed to the end of the crankshaft, so the centering accuracy of the damper shell 42 is increased, and consequently, vibration produced during rotation is suppressed. Here, the driven plate 38 is housed inside the damper shell 42, and has a radially outer portion (i.e., an output radially outer portion) and a radially inner portion (i.e., an output radially inner portion). Torque from the damper shell 42 is transmitted via the large damper spring 36a and the small damper spring 36b to the radially outer portion of the driven plate 38.

The radially inner portion of the driven plate 38 is fixed to an end surface, on the drive source side, of the annular set member 35. The damper shell 42 has a radially outer portion 42a (i.e., an input radially outer portion) and a cylindrical boss portion 42b that is curved so as to extend to an axial position of a radially inner side of the radially inner portion of the driven plate 38. The large damper spring 36a, the small damper spring 36b, and the radially outer portion of the driven plate. 38 are housed within the radially outer portion 42a of the damper shell 42. The annular bearing 40 is fitted in between the radially outer peripheral surface of the cylindrical boss portion 42b and the radially inner portion of the annular set member 35. Also, an outer race of this annular bearing 40 is also fitted to the radially inner peripheral surface of the radially inner portion of the driven plate 38, so the centering accuracy between the damper shell 42 and the driven plate 38 is also increased. Further, the radially inner portion of the driven plate 38 is fastened to the annular set member 35 by set bolts 52. Through-holes 42c are formed in portions of the damper shell 42 that correspond to the set bolts 52. A tool for fastening the set bolts 52 passes through the through-holes 42c. This kind of structure ensures mounting space on the radially outer side of the annular set member 35 regardless of the plate thickness of the driven plate 38, and thus increases mountability of the damper device 34.

The damper shell 42 is provided with a spring housing space S and an radially inner side opening K. The spring housing space S includes the plurality of circular columnar spaces described above and a communication space that communicates the plurality of circular columnar spaces with each other in the circumferential direction. The opening width of the radially inner side opening K in the axial direction is smaller than the diameter of the large damper spring 36a. Also, the radially inner side opening K is open on the radially inner side of the communication space. The radially outer portion of the driven plate 38 is fit into this opening K. A pair of spring steel seal members 50 is fixed by rivets 48 on both sides of the driven plate 38, and seals this opening K. A lubricant such as grease, for example, is filled into the spring housing space S.

As described above, the radially outer portion of the front shell 12a is offset so as to protrude toward the output side, i.e., the transmission 24 side. Therefore, an annular space X is formed between the radially outer portion of the front shell 12a and the drive plate 32, on the input side of the pump shell 12c, i.e., the engine 21 side. The damper device 34 is arranged in this annular space X. A center position PD of the damper device 34 in the direction of the axis C is positioned farther to the output side than the shaft end of the input shaft 26. The center position PD passes through the center of the large damper spring 36a and the small damper spring 36b. Also, the center position PD is positioned farther to the output side than an end surface of the input side of the cylindrical shaft portion 14b that is positioned on the radially inner portion of the turbine runner 14. As is evident from this, the damper device 34 is positioned so as to overlap with the shaft end portion of the input shaft 26, the radially inner portion of the turbine runner 14, i.e., the cylindrical shaft portion 14b, and the radially inner portion of the front shell 12a, in the radial direction. Accordingly, the radially inner portion of the front shell 12a that constitutes the input side portion of the pump shell 12c protrudes farther toward the input side, i.e., the engine 21 side, than the radially outer portion of the front shell 12a, and overlaps with almost the entire damper device 34 in the radial direction.

As a result, with the damper device 34, the large damper spring 36a and the small damper spring 36b are positioned on the radially outer side, so the coil diameter and the coil wire diameter can both be larger than they can be with the related art. Thus, the damper device 34 has good flexible damper performance, with a large torsion angle with respect to a change in torque. As a result of the damper device 34 having such good damper performance, torque vibration is able to be efficiently reduced, so the engine 21 can be operated in a low speed, high load operating range with good combustion efficiency. Also, when running in a locked-up (i.e., direct drive) state by the lock-up clutch 16, the torque converter 10 is supported by the input shaft 26 via the piston 16a and the turbine runner 14. At this time, the damper device 34 overlaps with the input shaft 26, so when a disturbance such as vibration is input, vibration of the damper device 34 is suppressed, so the damper device 34 is able to be even more stably supported. Also, as described above, the damper device 34 is positioned such that the center position PD in the direction of the axis C overlaps with the shaft end of the input shaft 26 and the cylindrical shaft portion 14b of the turbine runner 14 in the radial direction. Therefore, good operability is able to be achieved during assembly when supporting the torque converter 10 and fitting the one-way clutch 18 and the input shaft 26.

Figure 3:
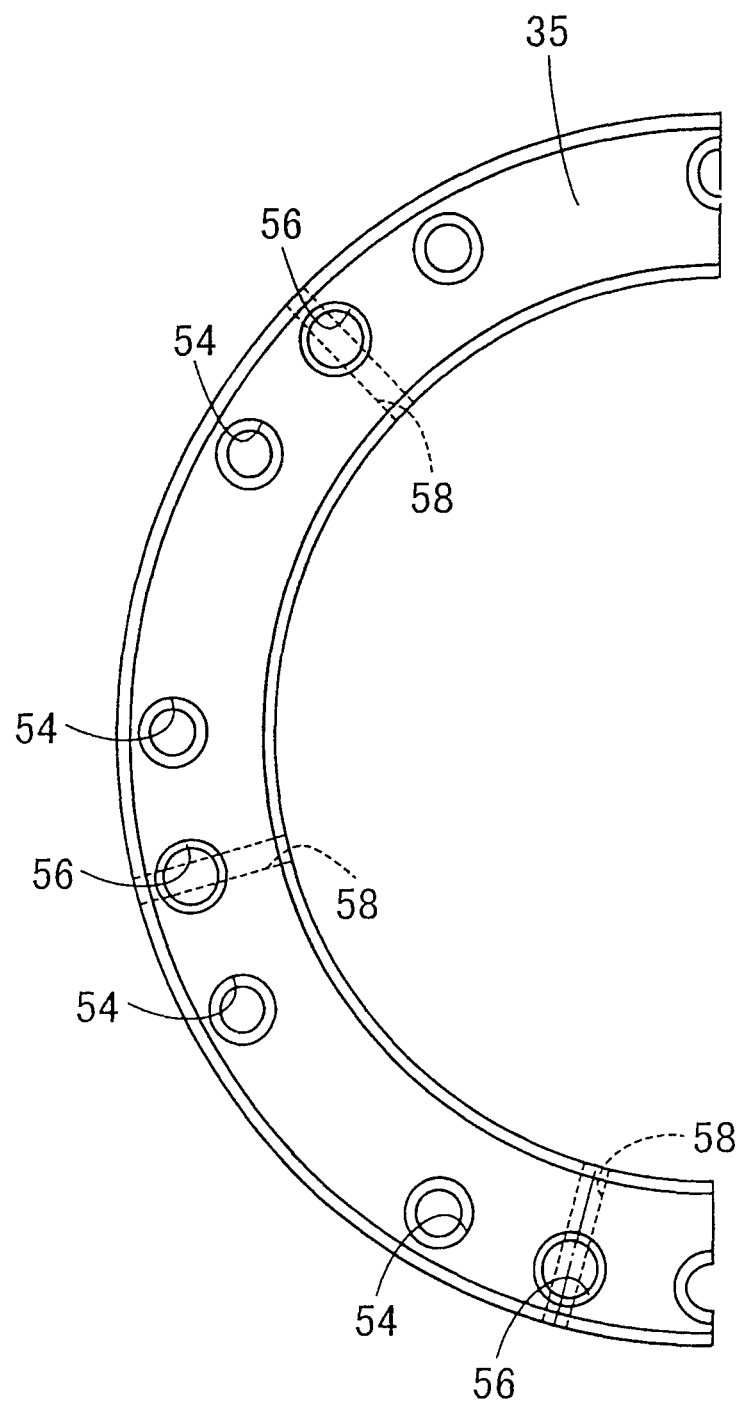
FIG. 3 is a front view showing the structure of an annular set member that is fixed to a pump shell of the vehicular torque converter in FIG. 1, in which half of the annular set member has been cut away.

FIG. 3 is a front view, from the engine 21 side, of the annular set member 35 that is fixed to the front shell 12a by welding or the like. In FIG. 3, a plurality of female threaded holes 54 are formed in (i.e., through) the annular set member 35. Set bolts 52 pass through the driven plate 38 and are screwed into the plurality female screw holes 54 in order to fix the driven plate 38 to the front shell 12a. Also, a plurality of interference preventing holes 56 for preventing interference of the annular set member 35 with the rivets 48 are formed as blind holes in the annular set member 35. Also, through-grooves 58 that extend through in the radial direction are formed in the surface of the annular set member 35 on the front shell 12a side, in positions where the interference preventing holes 56 are formed. These through-grooves 58 function as communication paths that discharge water collected in an annular space SS that is surrounded by the radially inner peripheral surface of the annular set member 35, the annular bearing 40, and the front shell 12a, and that opens to the radially inner side, to the radially outer side by centrifugal force or gravity.

A center piece is not provided in a center portion of the pump shell 12c in this example embodiment. The center piece is a member that fits inside of a centering hole 22b formed in the end surface of the crankshaft 22 to perform centering. A center piece that has conventionally been provided is denoted by the broken line in FIG. 2. In this example embodiment, an annular centering member 33 is fastened by a bolt 22a on the shaft end of the crankshaft 22 and protrudes toward the transmission 24 side in the axial direction. The annular centering member 33 serves as a centering structure in place of the center piece. A radially outer peripheral surface 33a of this centering member 33 is fitted to a radially inner peripheral surface of the cylindrical boss portion 42b, such that centering is performed. As described above, the cylindrical boss portion 42b is provided on the radially inner portion of the damper shell 42. The damper shell 42 is connected to the crankshaft 22 via the drive plate 32. Therefore, the centering member 33 and the cylindrical boss portion 42b of the damper shell 42 are fitted together and will not rotate relative to one another.

As described above, according to the torque converter 10 of this example embodiment, the driven plate (i.e., the damper output member) 38 is fixed to the annular set member 35 that is fixed to the pump shell 12c. Also, the cylindrical boss portion 42b is fitted with the centering member 33. The cylindrical boss portion 42b is provided on the radially inner portion of the damper shell (i.e., the damper input member) 42. The centering member 33 protrudes toward the pump shell 12c in the axial direction from the crankshaft 22 of the engine 21. Therefore, the damper shell 42 and the centering member 33 are fitted together without being able to rotate relative to one another, and are thus centered. The centering member 33 is fixed to the crankshaft 22 of the engine 21. Thus, the centering accuracy of the pump shell is able to be maintained without using a bearing or a bush between the center piece and the centering hole.

Also, in the torque converter 10 of this example embodiment, the damper shell 42 is connected to the drive plate 32 that is fixed to the shaft end of the crankshaft 22. Also, the centering member 33 is fitted to the cylindrical boss portion 42b, and is fixed, protruding toward the side away from the engine 21, to the shaft end of the crankshaft 22. Here, the cylindrical boss portion 42b is provided on the radially inner portion of the damper shell 42. The damper shell 42 is relatively rotatably supported via the annular bearing (i.e., the bearing assembly) 40 by the annular set member 35. Therefore, the driven plate 38 and the damper shell 42 are centered and able to rotate relative to each other by the annular bearing 40. The driven plate 38 is fixed to the annular set member 35 that is fixed to the pump shell 12c, and the damper shell 42 being fixed to the crankshaft 22. As a result, the damper shell 42, as well as the driven plate 38 that rotates relative to the damper shell 42, is also centered.

Also, according to the torque converter 10 of this example embodiment, the driven plate 38 has an output radially outer portion and an output radially inner portion. Torque from the damper shell 42 is transmitted to the output radially outer portion via the large damper spring (an elastic member) 36a and the small damper spring (an elastic member) 36b that are housed inside of the damper shell 42. The output radially inner portion is fixed by the set bolts 52 to the end surface of the annular set member 35 on the engine 21 side in the axial direction. The damper shell 42 has the input radially outer portion 42a and the cylindrical boss portion 42b. The input radially outer portion 42a houses the large damper spring 36a, the small damper spring 36b, and the radially outer portion of the driven plate 38. The cylindrical boss portion 42b is curved so as to extend to an axial position of a radially inner side of the radially inner portion of the driven plate 38. The annular bearing 40 is fitted in between the radially outer peripheral surface of the cylindrical boss portion 42b and the radially inner peripheral surface of the annular set member 35. Also, the radially inner peripheral surface of the cylindrical boss portion 42b and the radially outer peripheral surface of the centering member 33 are fitted together. Therefore, the centering accuracy of the pump shell is able to be maintained without using a bearing or a bush between the center piece and the centering hole 22b. Also, the annular bearing 40 is provided on the radially inner side of the annular set member 35. As a result, mounting space to the radially outer side of the annular set member 35 can be ensured regardless of the plate thickness of the driven plate 38, so mountability of the damper can be increased, which is advantageous.

According to the torque converter 10 of this example embodiment, the plurality of female threaded holes 54 is formed in the direction of the axis C in the annular set member 35. The plurality of set bolts 52 screws into the plurality of female threaded holes 54. The radially inner portion of the driven plate 38 is fastened to the annular set member 35 by the set bolts 52. Also, the through-holes 42c are formed in opposite portions of the damper shell 42 that are opposite the set bolts 52. Therefore, mounting space on the radially outer side of the annular set member 35 can be ensured regardless of the plate thickness of the driven plate 38, so mountability of the damper device 34 can be increased.

Also, according to the torque converter 10 of this example embodiment, the damper shell 42 is supported by the centering member 33 that is fixed to the end of the crankshaft, so the centering accuracy of the damper shell 42 is increased. As a result, vibration produced when the damper shell 42 rotates is suppressed. As described above, the damper shell 42 is a member with the largest mass of any of the parts that make up the damper device 34.

Also, according to the torque converter 10 of this example embodiment, the annular bearing 40 is simultaneously fitted to both the radially inner peripheral surface of the annular set member 35 and the radially inner peripheral surface of the radially inner portion of the driven plate 38. Therefore, the mutual centering accuracy of the damper shell 42 and the driven plate 38 is increased, so vibration of the vehicle is able to be further suppressed.

While example embodiments of the invention have been described in detail with reference to the drawings, the invention may also be applied in other modes.

In the example embodiment described above, the centering member 33 is fixed, together with the drive plate 32, to the shaft end surface of the crankshaft 22 by the bolt 22a. For example, the centering member 33 may also protrude out from the radially inner portion of the drive plate 32. The centering member 33 in this case is fixed to the crankshaft 22 indirectly, but the same effect is able to be obtained.

Also in the example embodiment described above, the torque converter 10 is given as one example of the vehicular fluid power transmitting device, but the vehicular fluid power transmitting device may also be a fluid coupling.

Further, the annular set member 35 in the example embodiment described above is a member that is continuous in the circumferential direction, but it may also be a set member that is constituted from a plurality of sectors or blocks divided in the circumferential direction. Also, the annular set member 35 may be set blocks in which the female threaded holes 54 are respectively formed. Then, the set blocks are arranged in the circumferential direction.

Also, in the example embodiment described above, annular bearing 40 formed by a ball bearing is used as the bearing assembly. The annular bearing 40 may also be formed by a metal bearing or a roller bearing or the like.

Also, in the example embodiment described above, the damper device 34 has the large damper spring 36a and the small damper spring 36b, but the types of damper springs are not limited to two types. That is, the damper device 34 may also have one type or three types of damper springs, and may have another structure or shape, e.g., the sizes and/or positions of the damper springs may be different.

Further, in the example embodiment described above, the blades 12d of the pump impeller 12, the blades 14d of the turbine runner 14, and the blades 20d of the stator 20 are offset toward the output side. However, the offset amount does not necessarily have to be such that the blades 20d of the stator 20 are offset to a position where they do not overlap with the one-way clutch 18.

The example embodiments and modes described above are merely examples. The invention may be carried out in modes that have been modified or improved in any of a variety of ways based on the knowledge of one skilled in the art.

The invention claimed is:

1. A vehicular fluid power transmitting device comprising:
   a pump impeller that has a plurality of pump blades and a pump shell to which torque from a drive source is input, the plurality of pump blades being provided inside of the pump shell;
   a turbine runner that has a plurality of turbine blades and a hub portion, is supported by a shaft end portion of an output shaft of the vehicular fluid power transmitting device, and is rotated by receiving operating fluid pushed out by the pump blades, the plurality of the turbine blades being provided in positions opposite the pump blades, and the hub portion supporting the turbine blades;
   a damper device that is provided between the drive source and the pump shell in an axial direction of the output shaft of the vehicular fluid power transmitting device, suppresses pulsation of torque from the drive source, and transmits the torque of which the pulsation is suppressed from the drive source to the pump shell, the damper device including a damper input member, an elastic member, and a damper output member, the damper input member being connected to an output shaft of the drive source and configured to transmit torque to the damper output member via the elastic member, the elastic member being housed inside the damper input member, and the damper output member being connected to the pump shell;
   a set member that is fixed to the pump shell, and to which the damper output member is connected;
   a centering member that is fixed to a shaft end of the output shaft of the drive source by a bolt, protrudes toward the pump shell from the output shaft of the drive source, and is fitted with the damper input member;
   a drive plate that is fixed to the shaft end of the output shaft of the drive source, and is connected to the damper input member; and
   a bearing assembly via which the damper input member is relatively rotatably supported by the set member,
   wherein: the output shaft of the drive source is a crankshaft of an engine; and the centering member is fixed to a shaft end of the crankshaft, and protrudes toward a side away from the engine in the axial direction.

2. The vehicular fluid power transmitting device according to claim 1, wherein:
   the damper output member is housed in the damper input member, and has an output radially outer portion and an output radially inner portion;
   torque from the damper input member is transmitted via the elastic member to the output radially outer portion, and the output radially inner portion is fixed to an end surface, on a drive source side, of the set member;
   the damper input member has an input radially outer portion and a cylindrical boss portion that is curved so as to extend, in the axial direction, to a position of a radially inner side of the output radially inner portion;
   the elastic member and the output radially outer portion are housed within the input radially outer portion;
   the bearing assembly is fitted in between a radially outer peripheral surface of the cylindrical boss portion and a radially inner peripheral surface of the set member; and
   a radially outer peripheral surface of the centering member is fitted to a radially inner peripheral surface of the cylindrical boss portion.

3. The vehicular fluid power transmitting device according to claim 2, further comprising
   a plurality of set bolts that screws into a plurality of female threaded holes formed in the axial direction in the set member,
   wherein: the output radially inner portion is fastened to the set member by the set bolts; and
   through-holes are formed in opposite portions of the damper input member, the opposite portions being opposite the set bolts.

4. The vehicular fluid power transmitting device according to claim 2, wherein the bearing assembly is fitted to a radially inner peripheral surface of the output radially inner portion.

* * * * *